United States Patent
Dyott et al.

[11] 3,900,245
[45] Aug. 19, 1975

[54] COUPLER FOR LIQUID CORE OPTICAL WAVEGUIDES

[75] Inventors: Richard Burnaby Dyott, London; John Hill Stewart, Stanmore, both of England

[73] Assignee: The Post Office, London, England

[22] Filed: Aug. 24, 1973

[21] Appl. No.: 391,360

[30] Foreign Application Priority Data
Sept. 6, 1972   United Kingdom............... 41240/72

[52] U.S. Cl. ........ 350/96 C; 350/96 R; 350/96 WG
[51] Int. Cl. .............................................. G02b 5/14
[58] Field of Search .......... 350/96 C, 96 WG, 96 R

[56] References Cited
UNITED STATES PATENTS
3,779,628   12/1973   Kapron et al. ..................... 350/96 C
3,793,541   2/1974   Ashkin et al. ............. 350/96 WG X
3,798,099   3/1974   Marcatili....................... 350/96 C X

*Primary Examiner*—John K. Corbin
*Attorney, Agent, or Firm*—Kemon, Palmer & Estabrook

[57] ABSTRACT

A dielectric optical waveguide coupling for use with liquid cored guides consists of a tapered section of solid cored dielectric optical waveguide inserted into the hollow core of the liquid cored guide. Two guides may be joined by having a solid cored dielectric optical waveguide with tapers at each end. The junction between the tapered solid cored guide and the liquid cored guide may be sealed with an epoxy resin.

8 Claims, 6 Drawing Figures

COUPLER FOR LIQUID CORE OPTICAL WAVEGUIDES

The invention relates to a device for, and a method of, coupling lengths of dielectric optical waveguide together.

The words "light" and "optical" as herein used are to be understood as referring to those regions of the electro-magnetic spectrum usually designated as the infra-red, visible, and ultra-violet.

One of the principal problems in the use of dielectric optical waveguides for communications systems, is that of joining together lengths of waveguide or attaching lengths of waveguide to light sources. Any connectors used must introduce as little loss as possible into the system, and be simple to use.

Known methods of coupling dielectric optical waveguides together involve either fusing the two waveguides together by melting the glass at the ends to be joined, or clamping the waveguides together in a jig. The fusing technique requires accurate aligning of the waveguides to be joined and of course the use of a heat source, also the application of heat creates obvious problems when filled liquid cored dielectric optical waveguides are used. Again when liquid filled dielectric optical waveguides are joined by clamping there is still the problem of alignment and possible leakage of the core liquid to be overcome.

An object of the present invention is to provide a dielectric optical waveguide coupling for use with liquid cored dielectric optical waveguides in which alignment and leakage problems are substantially eliminated.

A further object of the present invention is to provide a dielectric optical waveguide coupling for use with liquid cored dielectric optical waveguides which enable filled liquid cored dielectric optical waveguides to be joined without the application of heat.

Another object of the present invention is to provide dielectric optical waveguide couplings which enable a solid cored and liquid cored dielectric optical waveguide to be coupled together.

In the present invention, multi-mode liquid filled dielectric optical waveguides are coupled by the so-called "bottle stopper junction." In this a slowly tapered dielectric optical waveguide having a glass core is threaded into the end of the liquid cored dielectric optical waveguide until it obturates the end firmly. A layer of epoxy resin can be used to make the coupling permanent. Two situations in which such a coupling would be useful are:

a. laser to waveguide coupling. A short tail of multi-mode glass cored dielectric optical waveguide is attached to the laser and this waveguide is coupled to the liquid cored dielectric optical waveguide by means of a bottle stopper junction, thus avoiding the problem of coupling the laser directly to a liquid cored dielectric optical waveguide.

b. waveguide to waveguide coupling. A short section of multi-mode glass cored dielectric optical waveguide is tapered at both ends to give a double bottle stopper coupling between the two lengths of liquid cored waveguide.

According to the present invention there is provided a dielectric optical waveguide coupling for obturating an end of a liquid cored dielectric optical waveguide, including first and second lengths of dielectric optical waveguide, said first length of dielectric optical waveguide having a solid cladding defined by a first tapered exterior surface adjacent a first end of said first length of dielectric optical waveguide, said second length of dielectric optical waveguide having a liquid core and a solid cladding, said first tapered exterior surface disposed partially within the liquid core of said second length of dielectric optical waveguide.

Embodiments of the invention will now be described with reference to the following drawings in which.

Figure 1:
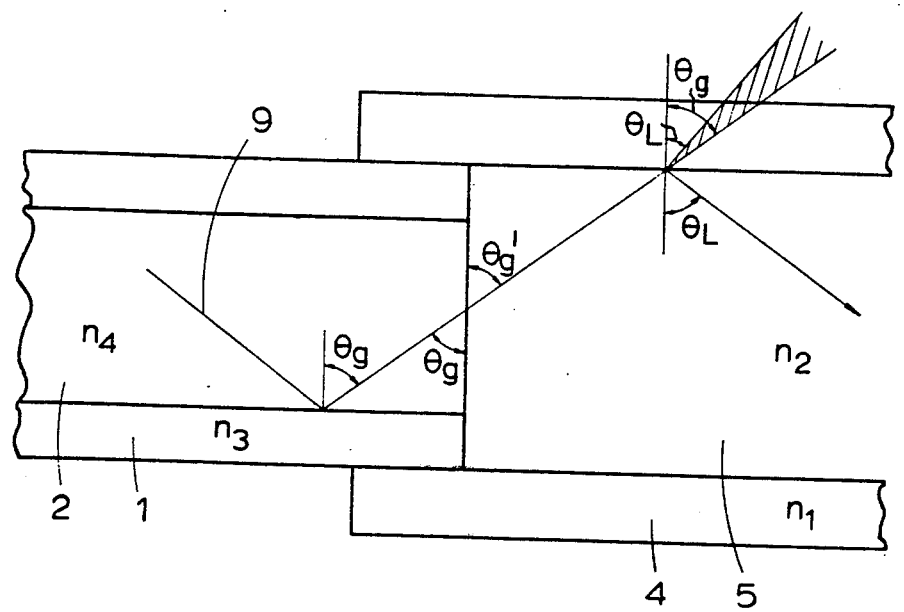
FIG. 1 shows the path of a ray of light passing through a connector according to the invention.

Referring now to the drawings, and FIG. 1 in particular, in which a connector is shown between a glass cored dielectric optical waveguide and a liquid cored dielectric optical waveguide. The marginal ray in the glass cored dielectric optical waveguide will make an angle $\theta_g$ with a radius of the dielectric optical waveguide having core 2 and cladding 1. In the liquid cored dielectric optical waveguide, having core 5 and cladding 4, the marginal ray will make an angle $\theta_L$ with the radius. Where $\theta_g \neq \theta_L$ there will be a mis-match and power will be lost. In the situation where $\theta_g < \theta_L$ the liquid cored dielectric optical waveguide will accept corecladding fraction of the light offered by the glass cored optical waveguide, and the rest will be radiated at the corecladding boundary of the liquid cored dielectric optical waveguide. Where $\theta_g > \theta_L$ all the light emitted by the solid cored dielectric optical waveguide is accepted by the liquid cored dielectric optical waveguide, but the liquid cored dielectric optical waveguide could accept still more light, and hence the coupling into the liquid cored dielectric optical waveguide is inefficient and the total power coupled into the liquid cored dielectric optical waveguide is less than it could be. Now $$\theta_g = \sin^{-1} \frac{n_3}{n_1} \quad (1)$$

and $$\theta_L = \sin^{-1} \frac{n_1}{n_2}$$

Figure 2:
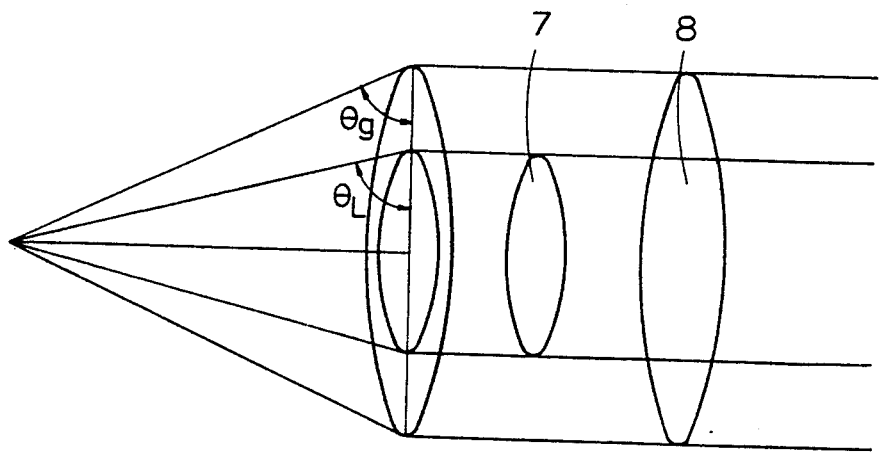
FIG. 2 shows the light cone accepted by a liquid cored dielectric optical waveguide from a connector according to the invention.

Consider first the case in which the core indices match exactly. Referring now to FIG. 2 the light offered by the glass cored dielectric optical waveguide is incident on an area 8. However only light incident on an area 7 is accepted by the liquid cored dielectric optical waveguide. Therefore the coupling efficiency, $E$, has the value $$E = \left[ \frac{\tan \theta_L}{\tan \theta_g} \right]^2 \quad (2)$$

assuming that the intensity distribution across the waveguide core is more or less uniform.

Substituting the values from equation (1) for $\theta_l$ and $\theta_g$ one finds $$E = \frac{\left(\frac{n_1}{n_2}\right)^2 \left[1 - \left(\frac{n_3}{n_4}\right)^2\right]}{\left(\frac{n_3}{n_4}\right)^2 \left[1 - \left(\frac{n_1}{n_2}\right)^2\right]} \quad (3)$$

Now writing the refractive index differences of the dielectric optical waveguide as follows $$n_2 = n_1 (1 + L) \quad (4)$$

and $$n_4 = n_3 (1 + g)$$

the expression for the coupling efficiency reduces to $$E = \frac{g^2 + 2g}{L^2 + 2L} \quad (5)$$

It should be noted that although equation 5 predicts a coupling efficiency of over 100 percent for a situation in which $g$ exceeds $L$, this is not a meaningful result. An efficiency of 120 percent according to equation 5 implies that the glass cored dielectric optical waveguide is offering 20 percent less light than the liquid cored dielectric optical waveguide can accept. Thus the glass cored dielectric optical waveguide has accepted 20 percent less light from the laser or initial length of liquid cored dielectric optical waveguide than can be coupled in to the length of the liquid cored dielectric optical waveguide in question. The true coupling efficiency is therefore only 100/120 i.e. 83 percent.

Considering now the more complex situation where $n_2 \neq n_4$, then in FIG. 1

$$n_4 \cos \theta_g = n_2 \cos \theta'_g \quad (6)$$

and hence since $$\theta_g = \sin^{-1}\left(\frac{n_3}{n_4}\right)$$

$$\cos^2 \theta'_g = \left(\frac{n_4}{n_2}\right)^2 - \left(\frac{n_3}{n_1}\right)^2 \quad (7)$$

In this case the coupling efficiency is $$E' = \frac{\tan \theta_l}{\tan \theta'_g} \quad (8)$$

which reduces to the form $$E' = \left[\frac{g^2 + 2g}{L^2 + 2L}\right]\left[\frac{1}{(1+g^2)\left(\frac{n_2^2}{n_4^2} - 1\right) + 1}\right] \quad (9)$$

Putting $$n_2 = n_4 (1 + \delta) \quad (10)$$

gives $$E' = \frac{E}{(1+g)^2 (\delta^2 + 2\delta) + 1} \quad (11)$$

One can construct tables of coupling efficiencies.

Table 1

Coupling efficiencies of fibres of varying index difference
$\delta = 0$

| L/g | 1% | 2% | 3% | 4% | 5% | 6% | 7% | 8% | 9% | 10% |
|---|---|---|---|---|---|---|---|---|---|---|
| 1% | 100 | 50 | 33 | 25 | 20 | 16 | 14 | 12 | 11 | 10 |
| 2% | 50 | 100 | 66 | 50 | 39 | 32 | 28 | 24 | 21 | 19 |
| 3% | 33 | 66 | 100 | 75 | 59 | 49 | 42 | 37 | 32 | 29 |
| 4% | 25 | 50 | 75 | 100 | 79 | 66 | 56 | 49 | 43 | 39 |
| 5% | 20 | 39 | 59 | 79 | 100 | 83 | 70 | 62 | 54 | 49 |
| 6% | 16 | 32 | 49 | 66 | 83 | 100 | 85 | 74 | 66 | 59 |
| 7% | 14 | 28 | 42 | 56 | 70 | 85 | 100 | 87 | 77 | 69 |
| 8% | 12 | 24 | 37 | 49 | 62 | 74 | 87 | 100 | 88 | 79 |
| 9% | 11 | 21 | 32 | 43 | 54 | 66 | 77 | 88 | 100 | 90 |
| 10% | 10 | 19 | 29 | 39 | 49 | 59 | 69 | 79 | 90 | 100 |

Table 1, calculated from equation 5 gives the efficiencies of coupling of dielectric optical waveguides whose core indices match, and whose core and cladding indices differ by from 1 to 10 percent.

Table 2

Coupling efficiencies of fibres of varying index difference.
$\delta = 5\%$

| L/g | 1% | 2% | 3% | 4% | 5% | 6% | 7% | 8% | 9% | 10% |
|---|---|---|---|---|---|---|---|---|---|---|
| 1% | 90 | 55 | 37 | 28 | 22 | 18 | 16 | 13 | 12 | 10 |
| 2% | 45 | 90 | 74 | 55 | 44 | 36 | 31 | 27 | 24 | 19 |
| 3% | 30 | 60 | 90 | 84 | 66 | 55 | 47 | 41 | 36 | 33 |
| 4% | 22 | 45 | 67 | 90 | 88 | 74 | 63 | 55 | 49 | 44 |
| 5% | 17 | 36 | 54 | 72 | 89 | 92 | 79 | 69 | 60 | 55 |
| 6% | 14 | 30 | 44 | 60 | 83 | 89 | 96 | 83 | 71 | 66 |
| 7% | 12 | 25 | 38 | 51 | 63 | 76 | 89 | 99 | 86 | 78 |
| 8% | 11 | 22 | 33 | 44 | 55 | 67 | 78 | 89 | 99 | 89 |
| 9% | 10 | 19 | 29 | 39 | 49 | 59 | 67 | 79 | 89 | 99 |
| 10% | 9 | 17 | 26 | 35 | 35 | 53 | 62 | 70 | 80 | 88 |

Table 2 calculated from equation 11 gives the equivalent of Table 1 where the two core indices differ by 5 percent.

One can see that quite large mis-match of the core refractive indices can be tolerated before the coupling efficiency falls to 90 percent (0.4 dB loss), but the core cladding index ratios of the two dielectric optical wavelengths must be very close. A 10 percent index difference dielectric optical waveguide can be matched to a 9 percent index difference dielectric optical waveguide with a 90 percent coupling efficiency, but any greater disparity cannot be tolerated.

Given the criteria outlined above, it can be seen that the glasses chosen for bottle stoppers will have to match almost exactly the indices of the liquid cored dielectric optical waveguides. It might be thought that simply means taking a glass of refractive index equal to that of the liquid and cladding it with the wall material of the liquid cored dielectric optical waveguide. This would be fallacious however, as two of the potential wall materials are quartz and Pyrex aglass made by J. A. Joblings, both of which have such low expansion coefficients that no glass will match to them. Apart from these two special cases the same glass could be used for cladding and wall, and all we require is a glass whose index matches that of the core liquid.

The liquids listed below together with their refractive indices are suitable for use as core fillings for liquid cored dielectric optical waveguides. All these liquids have low absorption in the infra-red, in the region of the GaAs operating wave length. The liquids are:

Bromotrichloromethane, whose refractive index is 1.5063

Carbon tetrachloride for which the refractive index is 1.4601

Tetrachloroethylene for which the refractive index is 1.5053

Hexachlorobuta-1.3-diene for which the refractive index is 1.5542

Hexachlorocyclopenta-1.3-diene for which the refractive index is 1.5600

It is therefore possible to envisage waveguides with quartz walls filled with any of these liquids, and Pyrex waveguides filled with any but carbon tetrachloride.

The possible fibre structures, along with their values of $L$ (see equation 4) are listed below:

P1 Pyrex/bromotrichloromethane for which $L$ is 2.19 percent

P2 Pyrex/tetrachloroethylene for which $L$ is 2.12 percent

P3 Pyrex/hexachlorobutadiene for which $L$ is 5.44 percent

P4 Pyrex/hexachlorocyclopentadiene for which $L$ is 5.83 percent

Q1 quartz/carbon tetrachloride for which $L$ is 0.21 percent

Q2 quartz/bromotrichloromethane for which $L$ is 3.38 percent

Q3 quartz/tetrachloroethylene for which $L$ is 3.31 percent

Q4 quartz/hexachlorobutadiene for which $L$ is 6.67 percent

Q5 quartz/hexachlorocyclopentadiene for which $L$ is 7.06 percent

There are two Schott glasses made by Schott with normal expansion coefficients whose refractive indices lie within a couple of percent of those of both quartz and Pyrex. The glasses are FK1, whose refractive index is 1.46888, and FK3 whose refractive index is 1.46267.

A number of other Schott glasses might be used with these as bottle stoppers. Table 3 lists the resultant fibres along with the values of $g$ from equation 4.

Table 3

Possible fibre structures to be used as bottle stoppers

| Fibre | Glasses | g | Fibre | Glasses | g |
|---|---|---|---|---|---|
| G1 | FK1/K11 | 1.98% | G33 | FK1/BaLF4 | 7.34% |
| G2 | FK1/BK4 | 2.02% | G34/FK1 | FK1/BaF3 | 6.96% |
| G3 | FK1/K10 | 2.05% | G35 | FK1/LF3 | 7.53% |
| G4 | FK1/ZKN7 | 2.21% | G36 | FK1/LF4 | 7.22% |
| G5 | FK1/PK1 | 2.25% | G37 | FK1/LF5 | 7.42% |
| G6 | FK1/BK5 | 2.29% | G38 | FK1/LF7 | 6.99% |
| G7 | FK1/BaLF5 | 5.17% | G39 | FK3/FK1 | 0.42% |
| G8 | FK1/LLF7 | 5.23% | G40 | FK3/BK2 | 3.65% |
| G9 | FK1/BaLF8 | 5.57% | G41 | FK3/BK7 | 3.56% |
| G10 | FK1/PSK3 | 5.58% | G42 | FK3/BaLK1 | 3.17% |
| G11 | FK1/BaK5 | 5.81% | G43 | FK3/BaLK3 | 3.66% |
| G12 | FK1/PSK50 | 5.88% | G44 | FK3/K3 | 3.64% |
| G13 | FK1/PK2 | 3.22% | G45 | FK3/K4 | 3.35% |
| G14 | FK1/PK50 | 3.38% | G46 | FK3/K7 | 3.16% |
| G15 | FK1/BK8 | 3.34% | G47 | FK3/KF3 | 3.38% |
| G16 | FK1/BK13 | 3.42% | G48 | FK3/KF6 | 3.57% |
| G17 | FK1/BaLK3 | 3.22% | G49 | FK3/PSK2 | 7.09% |
| G18 | FK1/K3 | 3.21% | G50 | FK3/BaK1 | 7.34% |
| G19 | FK1/K5 | 3.50% | G51 | FK3/BaK50 | 7.01% |
| G20 | FK1/K50 | 3.50% | C52 | FK3/SK11 | 6.75% |
| G21 | FK1/ZK2 | 3.39% | G53 | FK3/SK20 | 6.47% |
| G22 | FK1/KF6 | 3.13% | G54 | FK3/BaLF1 | 6.63% |
| G23 | FK1/KF9 | 3.54% | G55 | FK3/BaLF2 | 7.21% |
| G24 | FK1/BaK1 | 6.88% | G56 | FK3/BaLF3 | 7.24% |
| G25 | FK1/BaK50 | 6.56% | G57 | FK3/BaLF4 | 6.54% |
| G26 | FK1/SK11 | 6.30% | G58 | FK3/BaF2 | 7.44% |
| G27 | FK1/BaLF2 | 6.76% | G59 | FK3/LF1 | 7.32% |
| G28 | FK1/BaLF3 | 6.79% | G60 | FK3/BaF3 | 7.41% |
| G29 | FK1/LLF4 | 6.09% | G61 | FK3/LF4 | 7.68% |
| G30 | FK1/BaF2 | 6.62% | G62 | FK3/LF7 | 7.44% |
| G31 | FK1/LF1 | 6.85% | G63 | FK3/LF8 | 6.74% |
| G32 | FK1/SK12 | 7.60% | | | |

The data of Table 3 can be used along with the $L$ and $g$ values to calculate the theoretical coupling efficiencies from equation 11. Table 4 lists the coupling efficiencies so calculated.

Table 4

Predicted Coupling Efficiencies of Bottle stopper Junctions.

| | | | | | |
|---|---|---|---|---|---|
| P1/G2 | 92.2% | Q2/G18 | 93.2% | Q3/G43 | 92.0% |
| *P1/G3 | 93.6% | Q2/G19 | 98.1% | Q3/G44 | 92.2% |
| *P1/G4 | 99.1% | Q2/G20 | 98.1% | Q3/G45 | 99.7% |
| *P1/G5 | 97.7% | Q2/G21 | 98.6% | Q3/G46 | 93.9% |
| P1/G6 | 95.6% | Q2/G23 | 97.2% | *Q3/G47 | 99.5% |
| | | Q2/G40 | 93.9% | Q3/G48 | 94.1% |
| P2/G1 | 93.3% | Q2/G41 | 96.6% | | |
| P2/G2 | 95.2% | Q2/G42 | 92.1% | Q4/G49 | 97.1% |
| *P2/G3 | 96.7% | Q2/G43 | 94.0% | Q4/G50 | 93.7% |
| *P2/G4 | 95.9% | Q2/G44 | 94.2% | Q4/G51 | 98.1% |
| | | Q2/G45 | 97.3% | Q4/G52 | 97.8% |
| P3/G7 | 94.9% | Q2/G46 | 91.9% | Q4/G53 | 93.7% |
| P3/G8 | 96.1% | *Q2/G47 | 98.3% | Q4/G54 | 96.2% |
| *P3/G9 | 97.6% | Q2/G48 | 96.2% | *Q4/G55 | 95.4% |
| P3/G10 | 97.4% | | | *Q4/G56 | 94.9% |
| *P3/G11 | 93.4% | Q3/G13 | 95.5% | Q4/G57 | 94.7% |
| | | *Q3/G14 | 99.4% | Q4/G58 | 92.3% |
| *P4/G9 | 95.4% | Q3/G15 | 99.4% | Q4/G59 | 93.8% |
| P4/G10 | 95.6% | *Q3/G16 | 98.3% | Q4/G60 | 92.2% |
| *P4/G11 | 99.7% | Q3/G17 | 95.5% | Q4/G62 | 92.2% |
| P4/G12 | 99.1% | Q3/G18 | 95.3% | Q4/G63 | 97.7% |
| | | Q3/G19 | 96.2% | Q4/G24 | 99.9% |
| Q1/G39 | 50.3% | Q3/G20 | 96.0% | Q4/G25 | 95.0% |
| | | Q3/G21 | 99.3% | Q4/G26 | 91.2% |
| Q2/G13 | 93.5% | Q3/G22 | 93.0% | Q4/G27 | 98.0% |
| *Q2/G14 | 98.3% | Q3/G23 | 95.0% | Q4/G28 | 98.5% |
| Q2/G15 | 97.3% | Q3/G4C | 91.9% | Q4/G29 | 98.8% |
| *Q2/G16 | 99.4% | Q3/G41 | 94.5% | Q4/G30 | 96.6% |
| Q2/G17 | 93.5% | Q3/G42 | 94.1% | *Q4/G31 | 99.7% |
| | | Q4/G33 | 93.6% | | |
| | | Q4/G34 | 98.9% | | |
| | | *Q4/G36 | 95.2% | | |
| | | Q4/G37 | 92.5% | | |
| | | Q4/G38 | 98.5% | | |
| | | Q5/G49 | 98.8% | | |
| | | Q5/G50 | 97.9% | | |
| | | Q5/G51 | 97.6% | | |
| | | Q5/G52 | 93.6% | | |
| | | Q5/G54 | 92.2% | | |
| | | *Q5/G55 | 99.5% | | |

Table 4-Continued

Predicted Coupling Efficiencies of Bottle stopper Junctions.

| | |
|---|---|
| *Q5/G56 | 99.1% |
| Q5/G58 | 96.5% |
| Q5/G59 | 98.1% |
| Q5/G60 | 96.6% |
| Q5/G61 | 93.4% |
| Q5/G62 | 96.5% |
| Q5/G63 | 93.6% |
| Q5/G24 | 95.6% |
| Q5/G27 | 93.9% |
| Q5/G28 | 94.3% |
| Q5/G29 | 94.6% |
| *Q5/G31 | 95.4% |
| Q5/G32 | 94.2% |
| Q5/G33 | 97.7% |
| Q5/G34 | 96.8% |
| Q5/G35 | 95.3% |
| *Q5/G36 | 99.5% |
| Q5/G37 | 96.7% |
| Q5/G38 | 97.1% |

The choice of possible glasses can be narrowed by considering only those which give coupling efficiencies of 93 percent or better, and also by neglecting any whose expansion coefficient are not closely matched to the proposed cladding material. These glasses are indicated in Table 4 by an asterisk.

Figure 3:
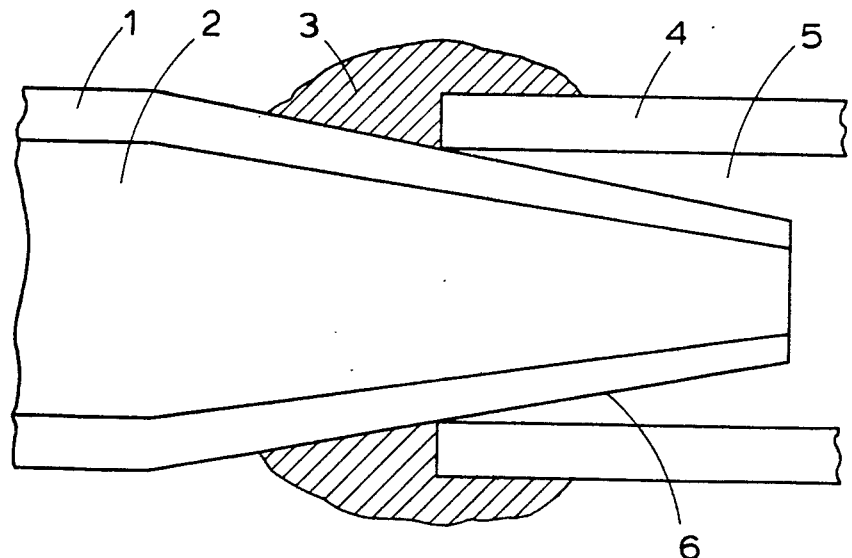
FIG. 3 shows a joint between two dielectric optical waveguides according to the invention.

The structure of a typical bottle stopper junction is shown in FIG. 3. One section of dielectric optical waveguide 1, has a slightly tapered exterior surface 6, (the taper is very strongly exaggerated in the drawing), this tapered surface has a solid core 2. The tapered surface 6 is disposed within the liquid filled core 5 of the dielectric optical waveguide 4 thus obturating the liquid filled core 5. The coupling is sealed and made permanent by coating the junction with a layer of epoxy resin 3. The liquid is thus sealed into the liquid cored dielectric optical waveguide.

Figure 4:
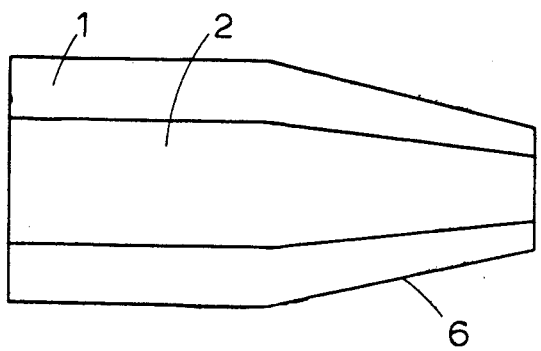
FIG. 4 shows one type of connector according to the invention.

In FIG. 4 a coupling unit 1 with a single tapered section is shown. Such a unit might be used to couple a laser to a dielectric optical waveguide.

Figure 5:
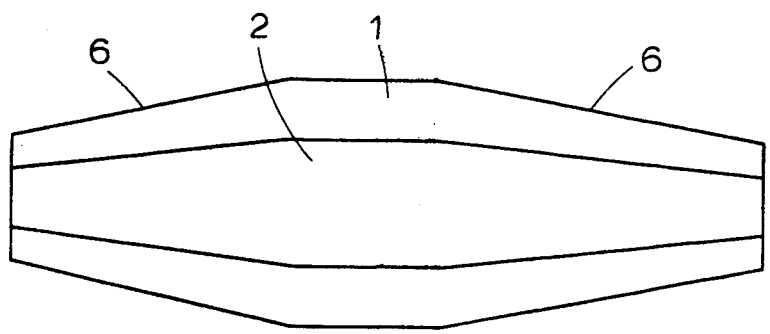
FIG. 5 shows another type of connector according to the invention.
Figure 6:
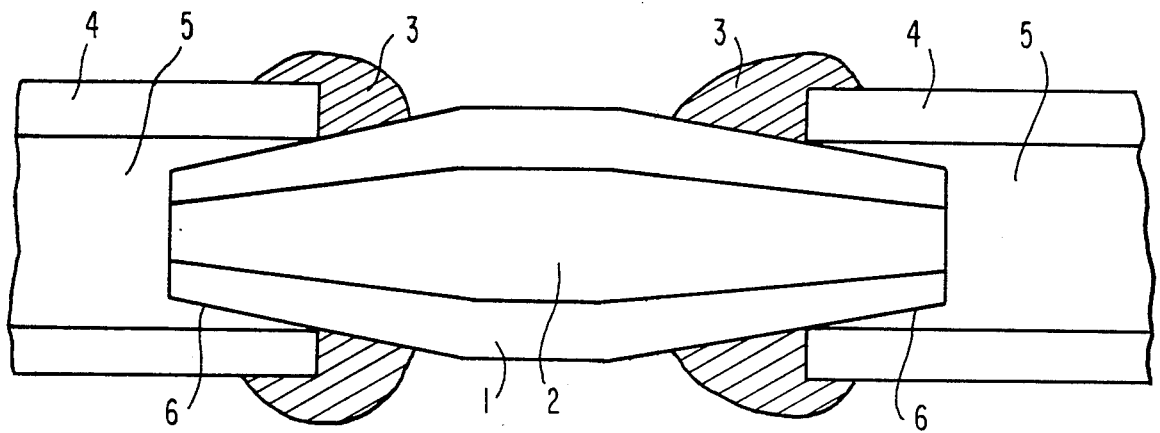
FIG. 6 shows a coupling unit of the type shown in FIG. 3 but coupling a pair of liquid core dielectric optical waveguides.

FIG. 5 shows a coupling unit with two tapered ends 6, which would be suitable for joining together two lengths of dielectric optical waveguide as shown in FIG. 6.

In both FIGS. 5 and 6 the tapers of the end section have been greatly exaggerated, in practice only a very slight taper would be used. Typically the tapers are such that the fibre diameter is reduced by a factor of 2 over a distance of 2 to 3 centimetres.

We claim:

1. A dielectric optical waveguide coupling including first, second and third lengths of dielectric optical waveguide, said first length having a solid cladding and core, a central cylindrical portion and oppositely tapered end portions, said second and third lengths each having a liquid core and a solid cladding, said lengths being disposed in axial alignment with each other and with said first length between the other two and the tapered portions of said first length being disposed partially within the liquid cores of said second and third lengths, said second length having a Pyrex cladding and a bromotrichlormethane core, said first length having a cladding consisting of Schott glass FK1 and a core selected from the group consisting of Schott glass 2KN7 and PK1, and said third length having a Pyrex cladding and a core selected from the group consisting of bromotrichlormethane and tetrachloroethylene.

2. A coupling as defined by claim 1 in which said lengths are sealed together by a layer of epoxy resin.

3. A dielectric optical waveguide coupling including first, second and third lengths of dielectric optical waveguide, said first length having a solid cladding and core, a central cylindrical portion and oppositely tapered end portions, said second and third lengths each having a liquid core and a solid cladding, said lengths being disposed in axial alignment with each other and with said first length between the other two and the tapered portions of said first length being disposed partially within the liquid cores of said second and third lengths, said second length having a Pyrex cladding and a core of hexachlorobutadiene, said first length having a cladding of Schott glass FK1 and a core selected from the group consisting of Schott glass BaLF8 and BaK5, and said third length having a Pyrex cladding and a core selected from the group consisting of hexachlorobutadiene and hexachlorocyclopentadiene.

4. A coupling as defined by claim 3 in which said lengths are sealed together by a layer of epoxy resin.

5. A dielectric optical waveguide coupling including first, second and third lengths of dielectric optical waveguide, said first length having a solid cladding and core, a central cylindrical portion and oppositely tapered end portions, said second and third lengths each having a liquid core and a solid cladding, said lengths being disposed in axial alignment with each other and with said first length between the other two and the tapered portions of said first length being disposed partially within the liquid cores of said second and third lengths, said second length having a quartz cladding and a core of bromotrichloromethane, said first length has a cladding selected from the group consisting of Schott glass FK1 and FK3 and core selected from the group consisting of Schott glass PK50, BK8 and KF3, and said third length having a cladding of quartz and a core selected from the group consisting of bromotrichloromethane and tetrachloroethylene 6. A coupling as defined by claim 5 in which said lengths are sealed together by a layer of epoxy resin.

7. A dielectric optical waveguide coupling including first, second and third lengths of dielectric optical waveguide, said first length having a solid cladding and core, a central cylindrical portion and oppositely tapered end portions, said second and third lengths each having a liquid core and a solid cladding, said lengths being disposed in axial alignment with each other and with said first length between the other two and the tapered portions of said first length being disposed partially within the liquid cores of said second and third lengths, said second length having a quartz cladding and a hexachlorobutadiene core, said first length has a cladding selected from the group consisting of Schott glasses FK1 and FK3 and a core selected from the group consisting of Schott glasses LF1, LF4, BaLF2 and BaLF3, said third length having a cladding of quartz and a core selected from the group consisting of hexachlorobutadiene and hexachlorocyclopentadiene.

8. A coupling as defined by claim 7 in which said lengths are sealed together by a layer of epoxy resin.

* * * * *